Patented Apr. 9, 1929.

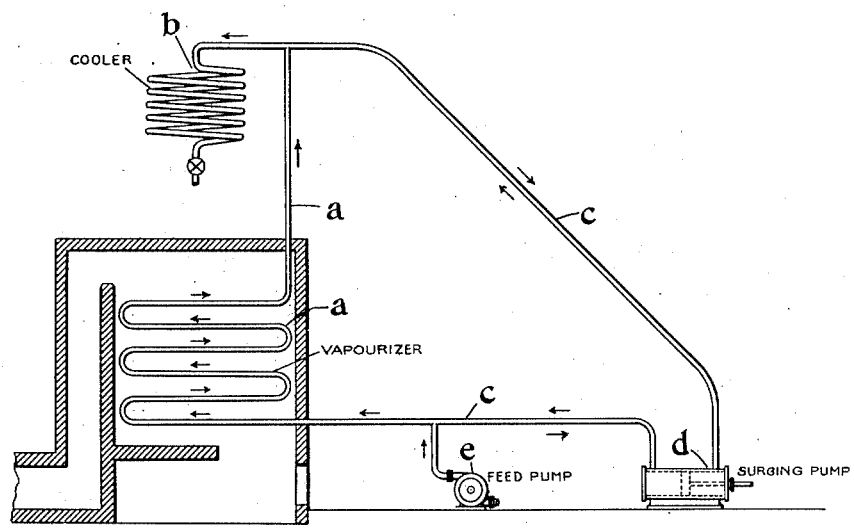

1,708,782

UNITED STATES PATENT OFFICE.

EVELYN STEWART LANSDOWNE BEALE, GEORGE HOWARD COXON, AND ALBERT ERNEST DUNSTAN, OF LONDON, ENGLAND, ASSIGNORS TO ANGLO-PERSIAN OIL COMPANY, LIMITED, OF LONDON, ENGLAND.

PRESSURE CRACKING TREATMENT OF LIQUID HYDROCARBONS.

Application filed May 9, 1928, Serial No. 276,336, and in Great Britain March 15, 1927.

This invention relates to the pressure cracking treatment of liquid hydrocarbons and particularly of heavy petroleum and other similar residues, and has among its general objects to minimize the production of carbon, and to maintain in the stream or in the column of liquid under treatment a relatively high degree of turbulence and yet a feed flow of relatively low velocity.

According to the invention a relatively high degree of turbulence independent of the rate of throughput is maintained in the stream or column of liquid in its course under treatment.

According to the invention moreover the high degree of turbulence is imposed by imparting surges to the liquid, that is to say by imposing upon the flowing liquid impulses alternating in opposite directions to cause a reciprocating movement to be imparted to the liquid in addition to its unidirectional predominant feed flow.

According to the invention moreover, the relatively high degree of turbulence is imposed by imparting to the liquid surges that rapidly alternate in opposite directions.

According to the invention moreover, the high degree of turbulence may be imposed upon the liquid during treatment, in its course through a tube or through a connected series of tubes or their equivalent, by connecting the tube or the series of connected tubes near the respective inlet and outlet ends, with the respective opposite ends of a reciprocating pump by means of pipes, whereby on the operation of the pump the liquid under treatment in the tube or in the series of connected tubes or their equivalent, is caused to move alternately in opposite directions to an extent corresponding to the capacity of the pump cylinder and at a velocity determined by the speed of the pump.

The invention comprises the conditions of method and the features of apparatus hereinafter described.

The invention is of especial application to a pressure cracking process in the liquid phase and particularly for the single cycle treatment of residue oils, whereby a limited quantity of light products of cracking and a non-viscous residue are produced, and the process may be advantageously carried out within a tube or a series of connected tubes, without the necessary use of a reactor such as usually employed, into which the liquid under treatment is discharged for the completion of the treatment. The oil in its course through the tube or through the series of connected tubes has imparted to it according to the invention a high velocity alternating in direction, by which a high degree of turbulence is maintained in the stream or column of liquid, under conditions in which the heat applied is rapidly transferred and the liquid is uniformly heated and all the liquid is treated for the same length of time.

In carrying the invention into effect, the treatment may be carried out within a number of parallel tubes connected to form a continuous tube or coil of zig-zag form, through which the oil to be treated may pass upwardly and successively in opposite directions in its course through the respective tubes, the oil being supplied by means of a feed pump into the lower part of the coil thus constituted, and being discharged at the upper end into a cooler. The cooler may itself be similarly constituted of a number of connected lengths of tubing, so provided that the treated oil may be cooled to the extent desired in its passage through.

The treatment may be carried out at a high pressure and the stream or column of liquid under treatment may be subjected in the manner described to a relatively high degree of turbulence by such means as a reciprocating pump, the opposite ends of whose cylinder are connected respectively at or near the inlet and outlet of the coil or connected lengths of tubing, and the latter may be mounted within a setting in which heat may be applied under regulation in any convenient manner.

In the use of such an apparatus the oil to be treated at the commencement of its course through the coil or connected lengths of tubing may be more or less rapidly heated, for example, to about 380° C., that is to say, to a temperature definitely below that of active decomposition, and in its further course heat may then be gradually and uniformly applied until a maximum oil temperature, for example of 450° C. is attained, at which temperature the oil actively decomposes. The application of heat may slowly continue until the maximum oil temperature is gradually attained, whereupon the temperature gradually falls, for example, 20° C. or more below the maximum temperature indicated. In this way and under the conditions of turbulence imposed, the skin temperature is maintained at a minimum throughout the coil, and the oil temperature is gradually reduced on active decomposition and consequent rise of vapour pressure, so that thus the maximum yield of light products of cracking may be obtained under a given working pressure without substantial vaporization. The treated oil may then be rapidly cooled for the purpose of arresting decomposition. Thus the treated oil may be cooled at least 50° C. while still under pressure within the coil or series of connected tubes, and the oil may then as usual either be flashed, by reduction of pressure, into a dephlegmator, or cooled down for further treatment or for distillation. Thus the time taken in the passage of the oil through the apparatus is only a few minutes.

It will be understood that the oil in its course through the coil or connected lengths of tubing is maintained in a highly turbulent state by the surge imposed upon it in the operation of the pump under conditions in which the oil is uniformly heated and heat rapidly transferred, whereby the production of carbon in the treatment is minimized, and that of the small amount of carbon produced a considerable part is withdrawn suspended in the treated liquid. Thus the carbonaceous and asphaltic bodies produced and held suspended in the oil in the course of its treatment are kept in suspension under the conditions imposed, and while a part is re-dissolved, the remainder in considerable part pass out with the treated oil. Moreover, the conditions imposed do not favour the production of carbon as the consequence of excessive heat applied to the oil or to part of the oil which is a common experience in known cracking plants, but which is avoided according to the invention.

A plurality of surges may be independently imposed in a number of zones (including the cooling zone) according to the requirements of heat in-put. Thus a plant may be constructed in two or more sections in each of which surging may be separately maintained according to the conditions of heat in-put and to the turbulence factor needed to inhibit or minimize deposition of carbon.

Thus long runs are possible without interruptions for cleaning, and owing to the substantially uniform conditions of high turbulence imposed throughout the course of the oil in its treatment, the carbon deposit is uniform, and the building up of irregular deposits, as for example, at bends and in other positions, which is a common experience towards the end of a run in an oil cracking plant having a unidirectional flow, is avoided. Furthermore, where the turbulence imposed is independent of throughput, the use of tubes of relatively small diameter is unnecessary, and thus tubes of larger diameter than usual may be usefully employed, whereby a large margin for carbon deposit may be conveniently provided, a condition which is of especial importance in the treatment of heavy asphaltic residues and when the extent of cracking required is considerable.

Again, it will be understood that the conditions of treatment according to the invention permit of the reduction to the minimum of the heating surface for a given volume of oil treated, inasmuch as the high degree of turbulence imposed greatly increases the rate of transfer of heat, and this advantage has practical importance having regard to the consequent smaller dimensions of the cracking plant required for a particular throughput, its smaller cost, and the greater convenience involved in its operation.

It will be understood that while the reduction in the amount of carbon produced is stated to be one of the general objects of the invention, it is important as an index of process conditions that are themselves necessary to the efficiency of the treatment and to the quality and yield of the light spirit produced.

The method of the invention is hereinafter described as carried out on an experimental plant of 100 gallons daily output. Such a plant is diagrammatically illustrated in the accompanying drawing. The plant consists of seven connected cracking tubes $a$ of one inch diameter and about six feet in length, connected in series to form a zig-zag coil of parallel horizontally disposed tubes, the uppermost of which was vertically disposed, and connected to a cooler $b\ b$ also formed of tubes of one inch diameter. The oil to be treated was forced by a pump $e$ at the rate of about 4 gallons per hour and a pressure maintained reaching 1,000 lbs. per square inch throughout the heated coil $a\ a$, and the treated oil was thence passed to the cooler $b\ b$ and there also surged while passing through. After passing the cooler $b\ b$, the pressure on the oil was released and reduced to the pressure of the atmosphere and the gas separated. In the experimental apparatus described branch pipes $c\ c$ were connected respectively at the inlet end and at the outlet end of the coil or series of connected tubes $a\ a$ to the respective ends of the cylinder of a double-acting reciprocating pump $d$ having no valves and running at 120 revolutions per minute and giving the oil a stroke of 24 inches, whereby the column of oil within the coil had imparted to it a velocity of about 12 feet per second alternately in opposite directions under conditions in which water hammer was avoided, and the feed flow of the oil was only 1/30th to 1/20th feet per second. The temperature of the oil at the end of the fourth tube from the lowest in the coil, was maintained at about 380° C., at the end of the fifth tube at about 450° C., at the end of the sixth tube at about 440° C., at the end of the seventh tube at about 400° C., and at the end of the first cooler tube $b$ at about 250° C.

Thus in an experimental apparatus such as that hereinbefore described a Persian gas oil was treated and a yield of motor spirit from 23 to 25% boiling below 200° C., was obtained with a production of less than .25% of coke; and a Persian 65% residue was treated and a yield of 15% motor spirit boiling below 200° C., was obtained with a production of less than .25% of coke.

It will be understood that in a plant designed for carrying out the invention on an industrial scale, the diameter of the tubes used would be substantially more than in the experimental plant described.

It will furthermore be understood that the invention is not limited to the use of an apparatus of the form hereinbefore described, nor to the manner in which a high degree of turbulence may be imposed upon a column or stream of oil in its treatment under the conditions and for the purposes described; nor is the invention limited to the use of a reciprocating pump for the purpose, although this presents a very convenient way of imposing turbulence. The effects aimed at, however, may be secured by other and equivalent means. Again any convenient means may be provided for variation according to practical requirements, in the degree of turbulence imposed, as for example by a variation in the stroke of the pump used, or by variation in its speed or in both. Again, the turbulence may be imposed in varying degrees, at different parts of the apparatus, or it may be localized only at those positions in the plant to which cracking is confined, or in which the deposit of carbon is possible; or again, the surges may be imposed from one and the same pump or from a number respectively through pipes of varying diameter, or otherwise. Furthermore, while it is preferred to avoid the use of a reactor, the process conditions according to the invention have utility also when applied in cracking apparatus in which reactors are used.

The process is not limited to the temperature and pressure conditions specifically referred to, as these conditions may be modified according to practical requirements, and the pressure employed may be such as is necessary substantially to maintain the particular oil under treatment in the liquid state. Furthermore, the invention is not limited to a particular time factor, but in general by reason of the rapidity and uniformity attained in the transfer of heat to the liquid, under the conditions of the treatment, the time factor is short.

We claim:—

1. A process for the cracking of hydrocarbon liquids, comprising imparting to the liquid to be cracked a predominant feed flow in a stream through an elongated passage of restricted cross section, imparting a cracking temperature to the stream of liquid in its passage, and imposing upon the liquid in its passage impulses alternating in opposite directions to effect substantial alternately reciprocating movement of the liquid in addition to its predominant feed flow through the restricted passage.

2. Apparatus for the cracking of hydrocarbon liquids, comprising a tube still, mechanical means connected to the ends of the tube still for impelling the liquid alternately in opposite directions through the tube still, means for applying a cracking temperature to the tube still, and means for forcibly feeding additional hydrocarbon liquid into the tube still.

EVELYN STEWART LANSDOWNE BEALE.
GEORGE HOWARD COXON.
ALBERT ERNEST DUNSTAN.